United States Patent
Niu et al.

(10) Patent No.: US 11,579,513 B2
(45) Date of Patent: Feb. 14, 2023

(54) INFORMATION DEVICE AND METHOD OF ASSEMBLING THE SAME

(71) Applicant: LENOVO (SINGAPORE) PTE. LTD., Singapore (SG)

(72) Inventors: Wenjin Niu, Yokohama (JP); Takehito Yamauchi, Yokohama (JP); Sara Akiyama, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 25 days.

(21) Appl. No.: 17/178,796

(22) Filed: Feb. 18, 2021

(65) Prior Publication Data

US 2022/0163869 A1 May 26, 2022

(30) Foreign Application Priority Data

Nov. 26, 2020 (JP) .............................. JP2020-195785

(51) Int. Cl.
*G03B 11/04* (2021.01)
*G06F 1/16* (2006.01)

(52) U.S. Cl.
CPC .......... *G03B 11/043* (2013.01); *G06F 1/1656* (2013.01); *G06F 1/1686* (2013.01)

(58) Field of Classification Search
CPC ............................ G03B 11/043; G06F 1/1686
See application file for complete search history.

(56) References Cited

U.S. PATENT DOCUMENTS

| | | | |
|---|---|---|---|
| 2007/0025726 A1* | 2/2007 | Kim ..................... | H04N 5/2252 348/E5.025 |
| 2019/0369661 A1* | 12/2019 | Kinoshita ............ | H04N 5/2254 |
| 2020/0393739 A1* | 12/2020 | Kinoshita .............. | G03B 11/04 |
| 2021/0200062 A1* | 7/2021 | Abe ...................... | G03B 11/043 |

FOREIGN PATENT DOCUMENTS

JP 2019028157 A 2/2019

* cited by examiner

*Primary Examiner* — Noam Reisner
(74) *Attorney, Agent, or Firm* — Shimokaji IP

(57) ABSTRACT

An information device has a camera cover unit that is fixed to an upper edge in the outside of a display device in a back cover. The camera cover unit includes a cover case that is fixed to the upper edge and a cover body that is housed in the cover case and is slidable between a first position and a second position. The cover body includes an end that is placed in the first position to cover the front of the camera and placed in the second position to avoid the front of the camera, and a leaf spring that is elastically deformable inward and outward of the frame of the upper edge.

4 Claims, 8 Drawing Sheets

INFORMATION DEVICE AND METHOD OF ASSEMBLING THE SAME

FIELD OF THE INVENTION

The present invention relates to an information device equipped with a camera and a method of assembling the same.

BACKGROUND OF THE INVENTION

Some of the portable information devices, such as notebook personal computers (laptop PCs), tablet computers (tablet PCs), or multifunctional mobile phones (smartphones), are each equipped with a camera. The camera is located beside a display, for example in a display housing.

The camera provided on a display surface is generally oriented toward a user, and the user may be concerned that unintended shooting may be taking place even when the camera is not operating. For that reason, the user may provide a means for covering the camera in some cases. As the means for covering the camera, a mechanical cover in which the cover body is manually slid as in Japanese Patent Application Laid-Open No. 2019-28157 could be considered.

The device described in Japanese Patent Application Laid-Open No. 2019-28157 includes a frame surrounding a display and a camera provided in an upper frame of the frame, wherein a cover body is slidable between a first position and a second position along the upper frame. Furthermore, the camera is covered when the cover body is in the first position, while the camera is exposed when the cover body is in the second position.

SUMMARY OF THE INVENTION

In order to position the cover body in either the first position or the second position, it is advisable to provide a spring and a protrusion that goes over the spring. Thereby, the cover body is placed in the first position when the protrusion is present on one side of the spring and is placed in the second position when the protrusion is present on the other side. The upper frame portion, however, where the camera is provided may be quite narrow in some cases, and there has been a concern that an unskilled worker would plastically deform the spring when incorporating the cover body into the frame portion.

The present invention has been made in view of the above problem, and an object of the present invention is to provide an information device that is easy to assemble and a method of assembling the same.

In order to solve the above problem and to achieve the above object, an information device according to the first aspect of the present invention includes: a display device; a back cover, that covers a rear surface, is the rear surface being on a non-display surface side of the display device; a camera that is fixed to an edge portion on the outer side than the display device in the back cover and is able to shoot ahead; and a camera cover unit fixed to the edge portion, wherein: the camera cover unit includes: a cover case fixed to the edge portion; and a cover body that is housed in the cover case and slidable between a first position and a second position, the cover body includes: a camera cover that is placed in the first position to cover the front of the camera and in the second position to avoid the front of the camera; and an elastic body that is elastically deformable inward and outward of the frame of the edge portion; and the cover case includes a protrusion that protrudes in a direction opposite to an acting part of the elastic body, and, upon the cover body sliding between the first position and the second position, presses and elastically displaces the acting part, so that thereafter the acting part goes over the protrusion.

With this information device, both the cover case and the cover body can be assembled in a space with sufficient margin, not in a narrow space such as an edge portion, and the assembly work is easy. Therefore, it is easy to place the elastic body in place, and there is little concern about deformation.

The cover case may include a cantilever arm that extends in a sliding direction of the cover body to support a side surface of the cover body and is elastically deformable to a side opposite to a side where the cover body is housed, and the back cover may include a support wall that supports the arm from the side opposite to the side where the cover body is housed. If this kind of arm is temporarily elastically deformed when the camera cover unit is assembled to widen the area where the cover body is inserted, the cover body can be easily housed in the cover case.

The cover body may include a guide hole that is long in the sliding direction on a surface facing the arm and the arm may include a guide protrusion that is inserted into the guide hole. This allows the cover body to be guided in the arm portion.

The back cover may include a perimeter wall that protrudes forward, the outer wall of the frame of the cover case may abut on the perimeter wall, and the protrusion may be provided on the outer wall of the frame and protrude in an inward direction of the frame. Since the protrusion provided on the outer wall of the frame is supported by the perimeter wall, the protrusion is hardly displaced even if the protrusion receives a reaction force from the acting part of the elastic body, and therefore the acting part can be pressed appropriately.

When the elastic body is a cantilever leaf spring that extends in the sliding direction of the cover body, the elastic body is able to be easily configured.

When the protrusion is made of polyacetal, good slidability is able be obtained with the acting part of the elastic body.

A method of assembling an information device according to the second aspect of the present invention includes the steps of: assembling a camera cover unit by housing a cover body in a cover case with an arm temporarily elastically deformed to a side opposite to a side where the cover body is housed; and fixing the assembled camera cover unit to an edge portion so that the arm abuts on a support wall, wherein: the information device includes: a display device; a back cover that covers a rear surface, the rear surface being on a non-display surface side of the display device; a camera that is fixed to an edge portion on the outer side than the display device in the back cover and is able to shoot ahead; and the camera cover unit fixed to the edge portion, the camera cover unit includes: the cover case fixed to the edge portion; and the cover body that is housed in the cover case and slidable between a first position and a second position, the cover body includes: a camera cover that is placed in the first position to cover the front of the camera and in the second position to avoid the front of the camera; and an elastic body that is elastically deformable inward and outward of the frame of the edge portion; and the cover case includes: a protrusion that protrudes in a direction opposite to an acting part of the elastic body, and, upon the cover body sliding between the first position and the second position, presses and elastically displaces the acting part, so that thereafter the acting part gets over the protrusion; and a cantilever arm that extends in a sliding direction of the cover body to support a side surface of the cover body and is elastically deformable to the side opposite to the side where the cover body is housed, and the back cover includes a support wall that supports the arm from the side opposite to the side where the cover body is housed.

In this method of assembling the information device, both the cover case and the cover body can be assembled in a space with sufficient margin, not in a narrow space such as an edge portion, and the assembly work is easy. Therefore, it is easy to place the elastic body in place, and there is little concern about deformation.

The above-described aspects of the present invention can cause both the cover case and the cover body to be assembled in a space with sufficient margin, not in a narrow space such as an edge portion, and can make the assembly work easy.

BRIEF DESCRIPTION OF THE DRAWINGS

FIG. 2A is a diagram illustrating a state where a cover body of the camera cover unit is in a first position; and FIG. 2B is a diagram illustrating a state where the cover body is in a second position.

DETAILED DESCRIPTION OF THE INVENTION

Hereinafter, an embodiment of an information device and a method of assembling the same according to the present invention will be described in detail with reference to appended drawings. The present invention, however, is not limited to the embodiment.

Figure 1:
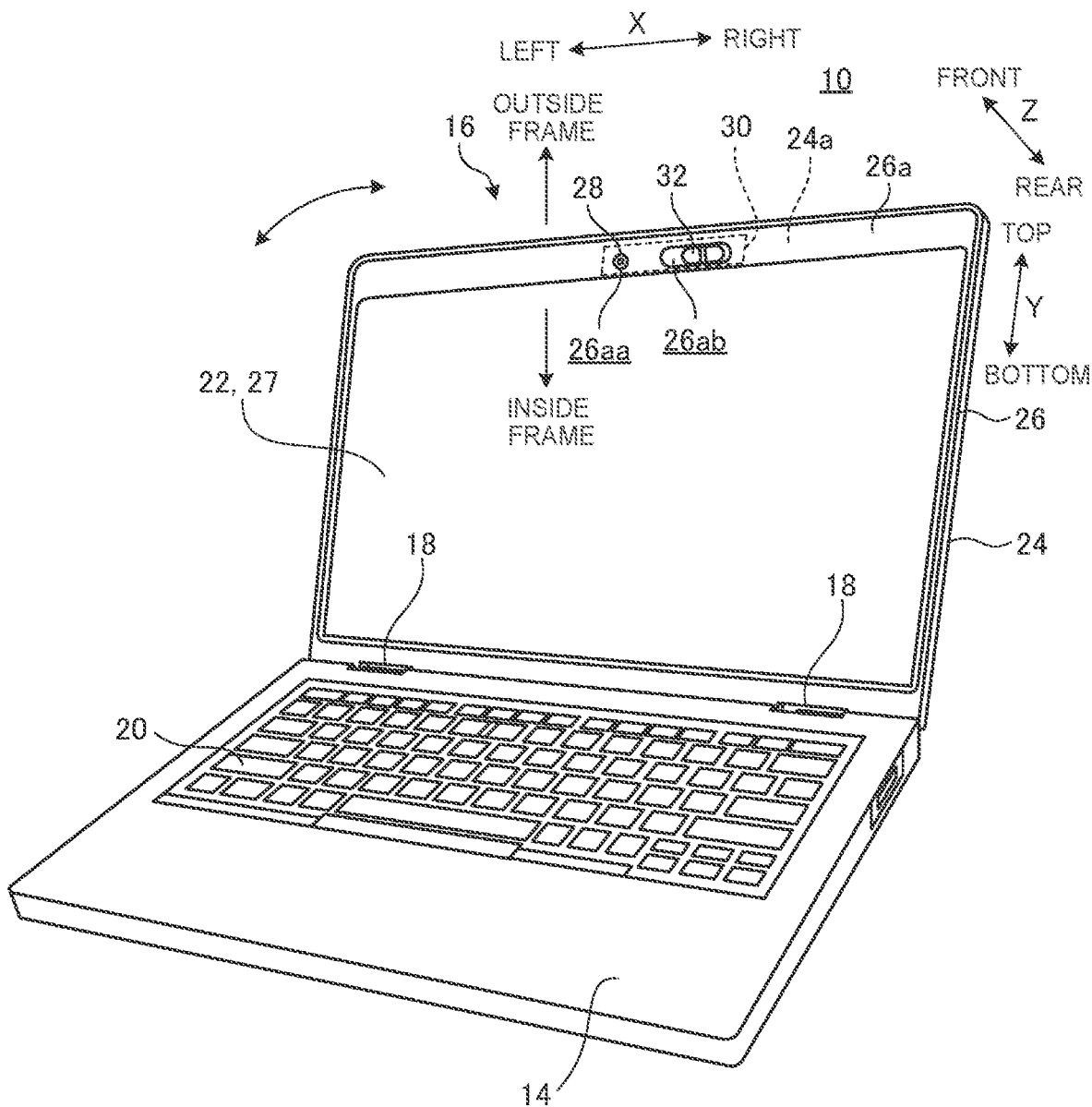
FIG. 1 is a perspective view of an information device according to an embodiment of the present invention.

FIG. 1 is a perspective view of an information device 10 according to an embodiment of the present invention. The information device 10 is a laptop PC. The information device according to the present invention is not limited to a laptop PC, and may be, for example, a desktop PC, a mobile tablet terminal, a multifunctional mobile phone, or the like.

In the information device 10, a display housing 16 is able to be opened and closed by a hinge 18 with respect to a main body housing 14, and closing the display housing 16 makes the information device 10 compact so as to be suitable for mobile usage. A keyboard 20 is provided on the upper surface of the main body housing 14.

In the following description, the left-right direction is also expressed as the X direction, the height direction is expressed as the Y direction, and the thickness direction of a display device 22 is expressed as the Z direction with reference to the display housing 16. In the description of the display housing 16 and the components thereof, it is assumed that the side closer to the hinge 18 is the bottom side and that the opposite side is the top side. Furthermore, in the Z direction, it is assumed that the display surface side is the front side and the non-display surface side on the opposite side is the rear side, with reference to the display device 22. In the description of frame-shaped members such as a frame 26 and an upper edge 24a and their components, which will be described later, it is assumed that the direction in which the display device 22 on the inside is directed is the inside of the frame, and the opposite side is the outside of the frame.

The display housing 16 has the display device 22 provided on the front surface, that is, the display surface, a back cover 24 covering the rear surface of the display device 22, and a thin frame 26 surrounding the display device 22 on the display surface side. The display device 22 is of a thin rectangular color liquid crystal or EL type and occupies most of the front of the display housing 16. The frame 26 is narrow and is a so-called narrow bezel. The back cover 24 is made of a material having appropriate strength and toughness as an outside wall of the information device 10, such as, for example, a polycarbonate material. The back cover 24 has a slightly larger area than the display device 22. The upper edge (edge portion) 24a, which is a portion higher than the upper end of the display device 22 in the back cover 24, is provided with a camera 28 and a camera cover unit 30. The camera 28 is provided in the central portion of the upper edge 24a. As described later, the camera cover unit 30 is used to switch the camera 28 between an exposed state and a shielded state.

The upper frame 26a in the frame 26 has an exposed hole 26aa formed in front of the camera 28, and a long hole 26ab formed slightly to the right of the exposed hole 26aa. In the long hole 26ab, there is provided a knob 32, which is a part of the camera cover unit 30, so as to be movable in the left-right direction.

Figure 2A:
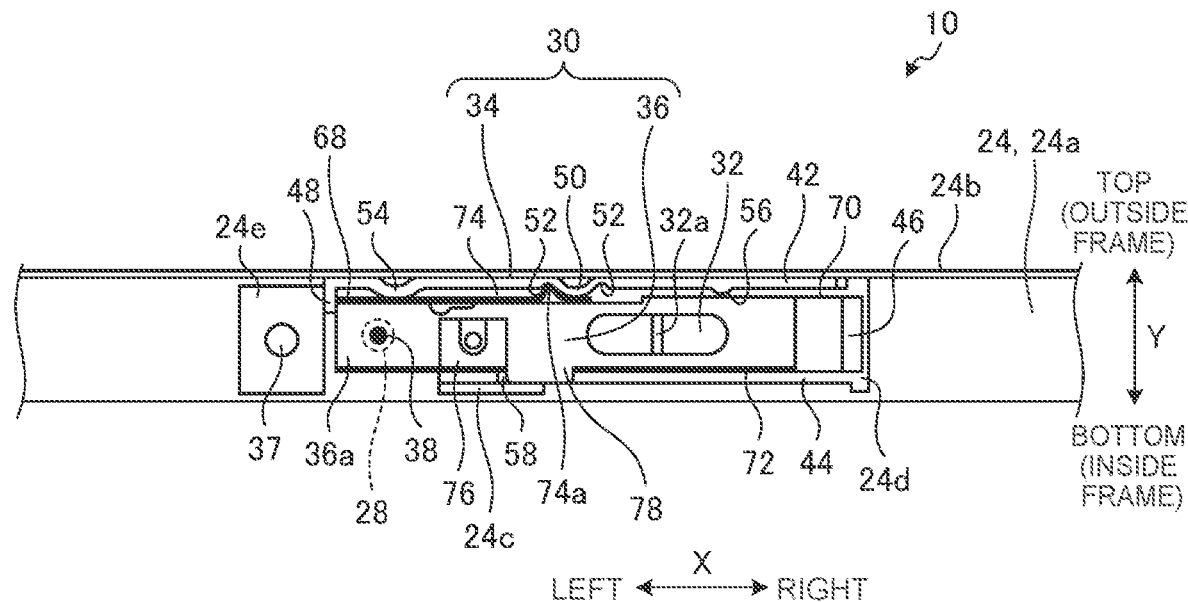
FIGS. 2A and 2B are enlarged front views of a camera and a camera cover unit provided on an upper edge and their peripheral parts.
Figure 2B:
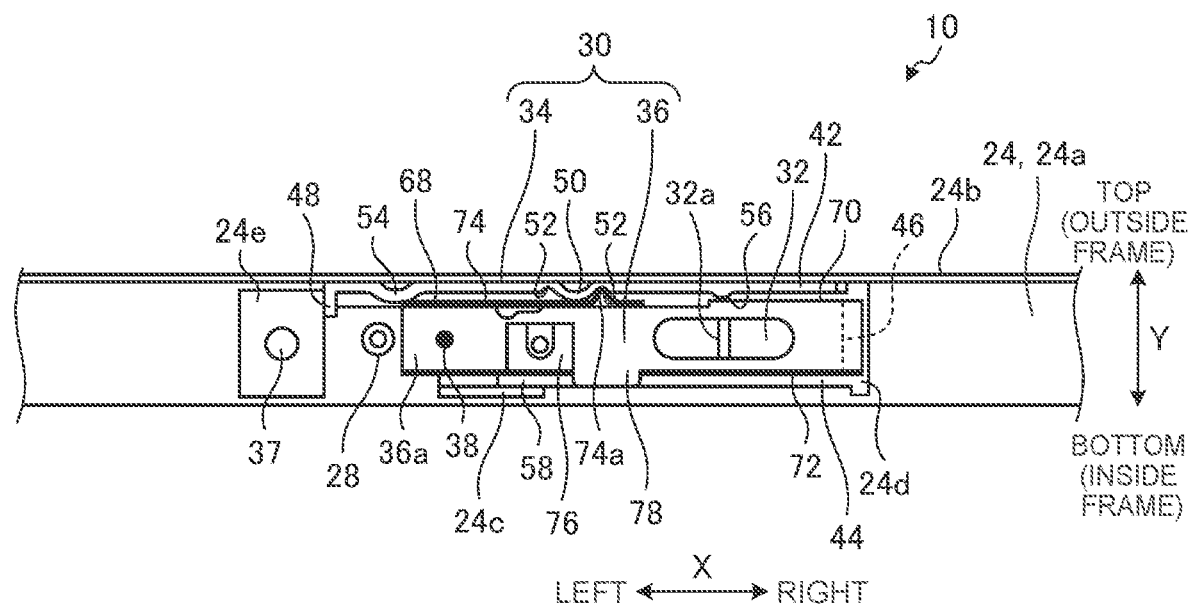

FIGS. 2A and 2B are enlarged front views of the camera 28 and the camera cover unit 30 provided on the upper edge 24a and their peripheral parts: FIG. 2A is a diagram illustrating a state where a cover body 36 of the camera cover unit 30 is in a first position; and FIG. 2B is a diagram illustrating a state where the cover body 36 is in a second position. FIGS. 2A and 2B are diagrams in which the frame 26 has been removed. The state of the first position is the shielded state of the camera 28, and the state of the second position is the exposed state of the camera 28.

The camera cover unit 30 includes: a cover case 34 fixed to the upper edge 24a on the outer side of the frame than the display device 22 on the back cover 24; and the cover body 36 that is housed in the cover case 34 and is movable along the upper edge 24a (that is, along the X direction). The cover body 36 is slidable between the first position (see FIG. 2A) to the right and the second position (see FIG. 2B) to the left. At the end of the back cover 24, there is provided a perimeter wall 24b that protrudes forward. An outer wall of the frame 42 of the cover case 34 is in contact with the perimeter wall 24b.

As described later, an arm 58 is provided in the inner part of the frame of the cover case 34. The arm 58 abuts on an in-frame support wall (support wall) 24c provided on the upper edge 24a. The right end of the cover case 34 abuts on a lateral support wall 24d provided on the upper edge 24a. The cover body 36 is provided with the knob 32 described above, and the cover body 36 slides between the first position and the second position by the operation of the knob 32 in the X direction along the long hole 26ab (see FIG. 1). The knob 32 is provided with a vertical bar 32a, which is easy to operate with fingers or nails. An infrared port 37 is provided in a position slightly to the left of the camera 28 on the upper edge 24a. The infrared port 37 is provided on a support base 24e.

As illustrated in FIG. 2A, when the cover body 36 is in the first position, which is to the left, the end (camera cover) 36a of the cover body 36 covers the front of the camera 28. In the cover body 36, at least the end 36a is formed of a material that does not transmit light and functions as a camera cover. The front of the camera 28 is covered with the end 36a, thereby preventing the shooting of a user and enabling the user to achieve a sense of security. The end 36a is marked with a colored (for example, red) mark 38. When the cover body 36 is in the first position, the mark 38 is exposed from the exposed hole 26aa (see FIG. 1), and the user is able to recognize that the camera 28 is in the shielded state.

As illustrated in FIG. 2B, when the cover body 36 moves to the second position, which is to the right, the end 36a also moves and is placed in a position avoiding the front of the camera 28, by which the camera 28 is exposed from the exposed hole 26aa (see FIG. 1). Thus, the end 36a moves and the camera 28 is exposed, thereby enabling the camera 28 to shoot the area in front thereof.

Figure 3:
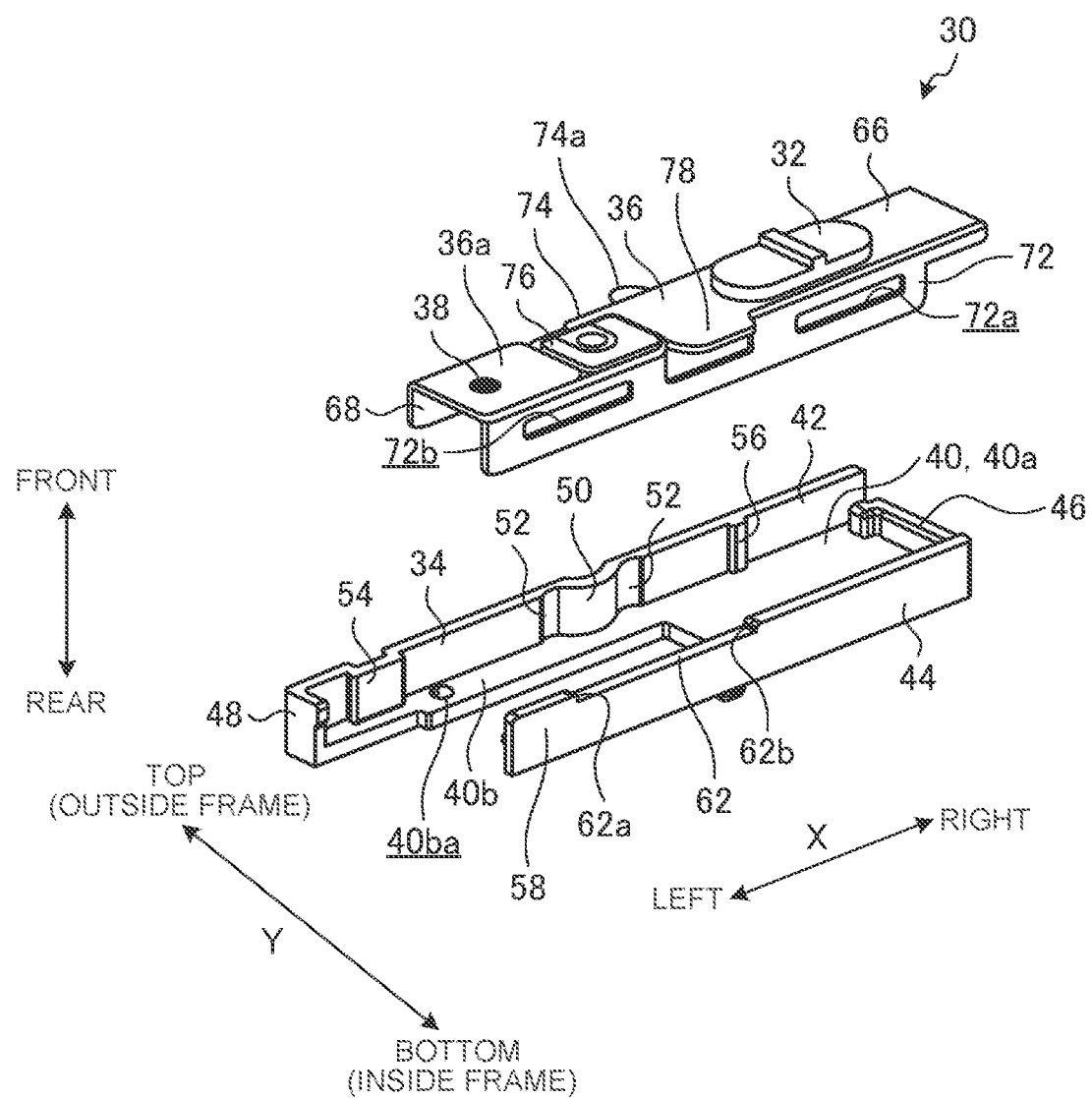
FIG. 3 is an exploded perspective view of the camera cover unit.
Figure 4:
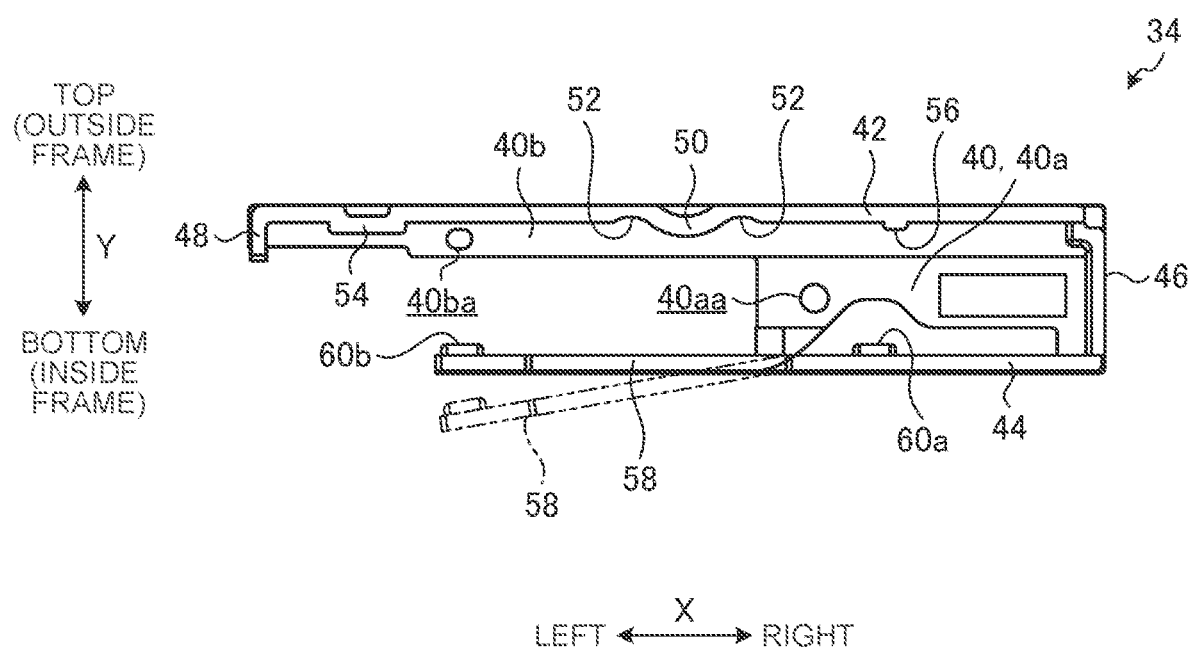
FIG. 4 is a plan view of a cover case.
Figure 5:
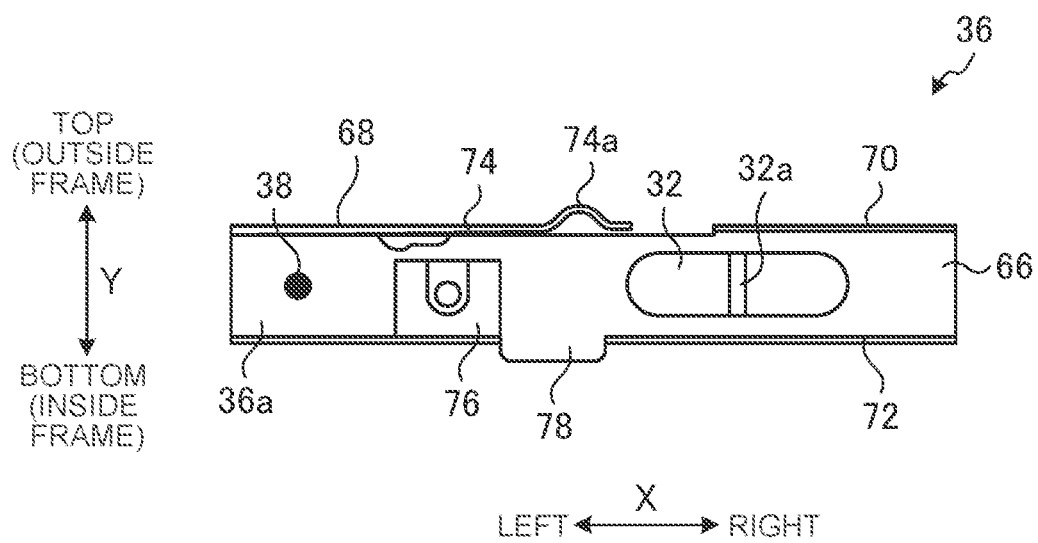
FIG. 5 is a plan view of the cover body.

FIG. 3 is an exploded perspective view of the camera cover unit 30. FIG. 4 is a plan view of the cover case 34. FIG. 5 is a plan view of the cover body 36.

As illustrated in FIGS. 3 and 4, the cover case 34 has a bottom plate 40, and an outer wall of the frame 42 and an inner wall of the frame 44 respectively standing from inward and outward ends of the frame on the bottom plate 40. A slightly lower right wall 46 is provided at the right end of the bottom plate 40, and a small left wall 48 is provided at the left end of the outer wall of the frame 42. The bottom plate 40 includes a first bottom 40a, which connects the outer wall of the frame 42 and the inner wall of the frame 44 in a right-side position, and a second bottom 40b, which is narrow and is formed along the outer wall of the frame 42 from the first bottom 40a. A positioning hole 40aa is formed in the first bottom 40a, and a positioning hole 40ba is formed in the second bottom 40b. Positioning protrusions 24aa and 24ab (see FIG. 8) protruding from the bottom surface of the upper edge 24a are inserted into the positioning holes 40aa and 40ba, respectively, by which the cover case 34 is positioned.

A convex protrusion 50 is provided inward in the frame in the substantially central part of the outer wall of the frame 42. Depressions 52 are formed on the left and right of the protrusion 50. The protrusion 50 is configured as part of the outer wall of the frame 42, with the central portion protruding most inward of the frame and gently sloping to the left and right to connect to the depressions 52, forming a mountain shape. The left-side portion of the outer wall of the frame 42 has a flat protrusion 54 facing inward of the frame, and the right-side portion has a flat protrusion 56 facing inward of the frame. The outer wall of the frame 42 is connected to the second bottom 40b and therefore is strong and hardly deflects.

As described above, the material of the back cover 24 is required to have appropriate strength and toughness. There are, however, few material restrictions on the cover case 34, and a polyacetal material is applied in this embodiment. The protrusion 50, which is part of the cover case 34, is also made of polyacetal material and has a smooth surface. The surface of the cover case 34 can be smoothed if at least the portion of the protrusion 50 is made of polyacetal material, and good slidability with a bent part 74a, which is described later, can be obtained.

The substantially left half of the inner wall of the frame 44 forms the arm 58. Although the substantially right half of the inner wall of the frame 44 is connected to the first bottom 40a, the arm 58 in the substantially left half is not connected to the first bottom 40a nor to the second bottom 40b and protrudes to the left like a single plate. Therefore, the arm 58 acts as a cantilever elastic body extending in the X direction, has moderate elasticity, and can be tilted as indicated by a virtual line. Small guide protrusions 60a and 60b are provided on the right-side portion of the inner wall of the frame 44 and on the tip portion of the arm 58, respectively. Along the front edge of the inner wall of the frame 44, a shallow groove 62 is formed from the substantially central part to the vicinity of the left end.

As illustrated in FIGS. 3 and 5, the cover body 36 includes a front plate 66, a first out-of-frame bent piece 68 and a second out-of-frame bent piece 70, both of which are bent at 90 degrees at the left and right outer edges of the frame of the front plate 66 respectively, and an in-frame bent piece 72 that is bent at 90 degrees at the inner edge of the frame. The first out-of-frame bent piece 68 and the second out-of-frame bent piece 70 are supported by abutting on flat protrusions 54 and 56 of the cover case 34. A leaf spring (elastic body) 74 protrudes to the right from the first out-of-frame bent piece 68 while being separated from the front plate 66. In other words, the leaf spring 74 is of the cantilever type that extends in the X direction. The first out-of-frame bent piece 68 and the leaf spring 74 form a continuous surface. There is provided the bent part 74a, which is mountain-shaped and convex in the outward direction of the frame, near the right end of the leaf spring 74. In other words, the bent part 74a and the above protrusion 50 protrude in opposite directions from each other. The bent part 74a can be elastically displaced inward and outward of the frame. The bent part 74a is located in the substantially central and outer part of the frame of the cover body 36. The front plate 66, the first out-of-frame bent piece 68, the second out-of-frame bent piece 70, the in-frame bent piece 72, and the leaf spring 74 are formed by cutting and pressing one metal plate. The front plate 66 is provided with a plate piece 76, and the above knob 32 and mark 38. The plate piece 76 is a diffusion sheet provided for the purpose of causing a point light source of an indicator LED to make a surface emit light.

The right-side portion and the left-side portion in the in-frame bent piece 72 are respectively provided with guide holes 72a and 72b that are long in the X direction. The guide protrusions 60a and 60b of the cover case 34 are inserted into the guide holes 72a and 72b, and thus the cover body 36 housed in the cover case 34 is guided in the X direction and prevents coming off. The projecting piece 78 facing inward of the frame is provided in the substantially central portion of the front plate 66. The protruding piece 78 is separated from the in-frame bent piece 72 and forms a continuous surface with the front plate 66 without bending. The protruding piece 78 fits into the groove 62 and slides in the X direction. The displacement of the cover body 36 is restricted by the protruding piece 78 sliding and abutting on the left and right ends 62a and 62b of the groove 62.

In the camera cover unit 30, when the cover body 36 slides between the first position and the second position, the protrusion 50 presses the bent part 74a, which is an acting part of the leaf spring 74, to elastically displace the bent part 74a, and then the bent part 74a gets over the protrusion 50. This positions the cover body 36 to either the first position or the second position. When the cover body 36 is in the first or second position, the bent part 74a fits in the depression 52 and stabilizes.

The protrusion 50, which is part of the outer wall of the frame 42 and protrudes to the inside of the frame, receives a reaction force from the bent part 74a of the leaf spring 74 to the outside of the frame when the cover body 36 slides between the first position and the second position. Since the outer wall of the frame 42, however, is supported by abutting on the perimeter wall 24b of the back cover 24, it is not displaced and is able to appropriately press the bent part 74a. In addition, the outer wall of the frame 42 can be made thinner since it is supported by the perimeter wall 24b.

Furthermore, even if the protrusion 50 receives a reaction force from the bent part 74a and is slightly displaced to the outside of the frame together with the perimeter wall 24b, there is no concern about interference since there are no components of the information device 10 on the outer side of the frame other than the perimeter wall 24b. Depending on the design conditions, however, the camera cover unit 30 may be placed upside down in the edge portion where the camera 28 is provided.

Subsequently, a method of assembling the information device 10 will be described. This section describes an assembly process of the camera cover unit 30 and a process of mounting the assembled camera cover unit 30 on the upper edge 24a regarding the assembly of the information device 10.

Figure 6:
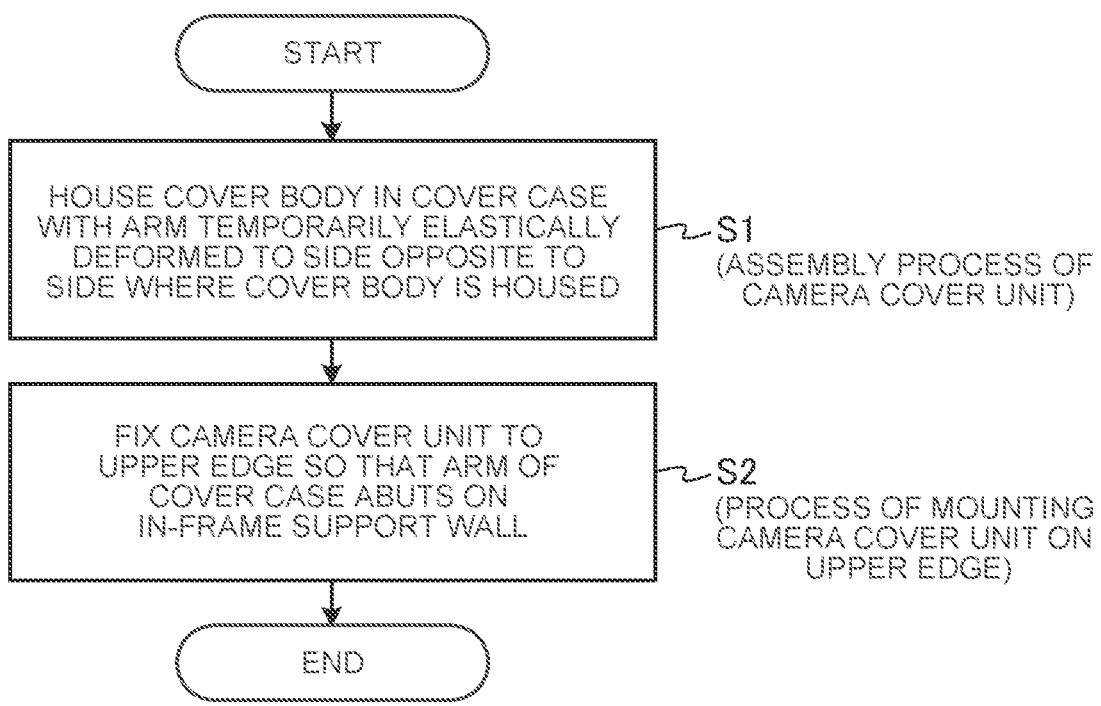
FIG. 6 is a flowchart illustrating a method of assembling the information device.
Figure 7:
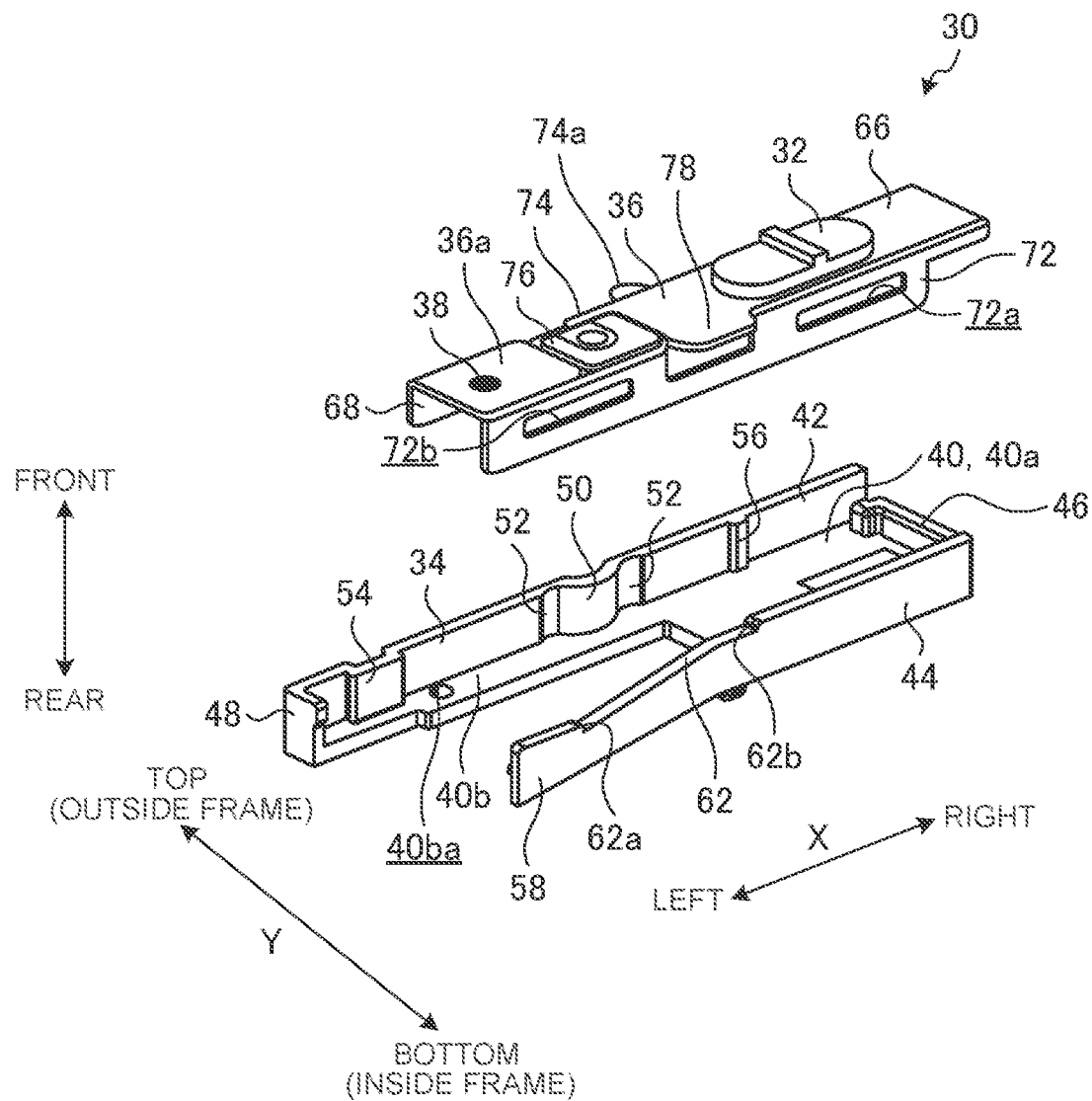
FIG. 7 is a perspective view illustrating a state of an assembly process of the camera cover unit.
Figure 8:
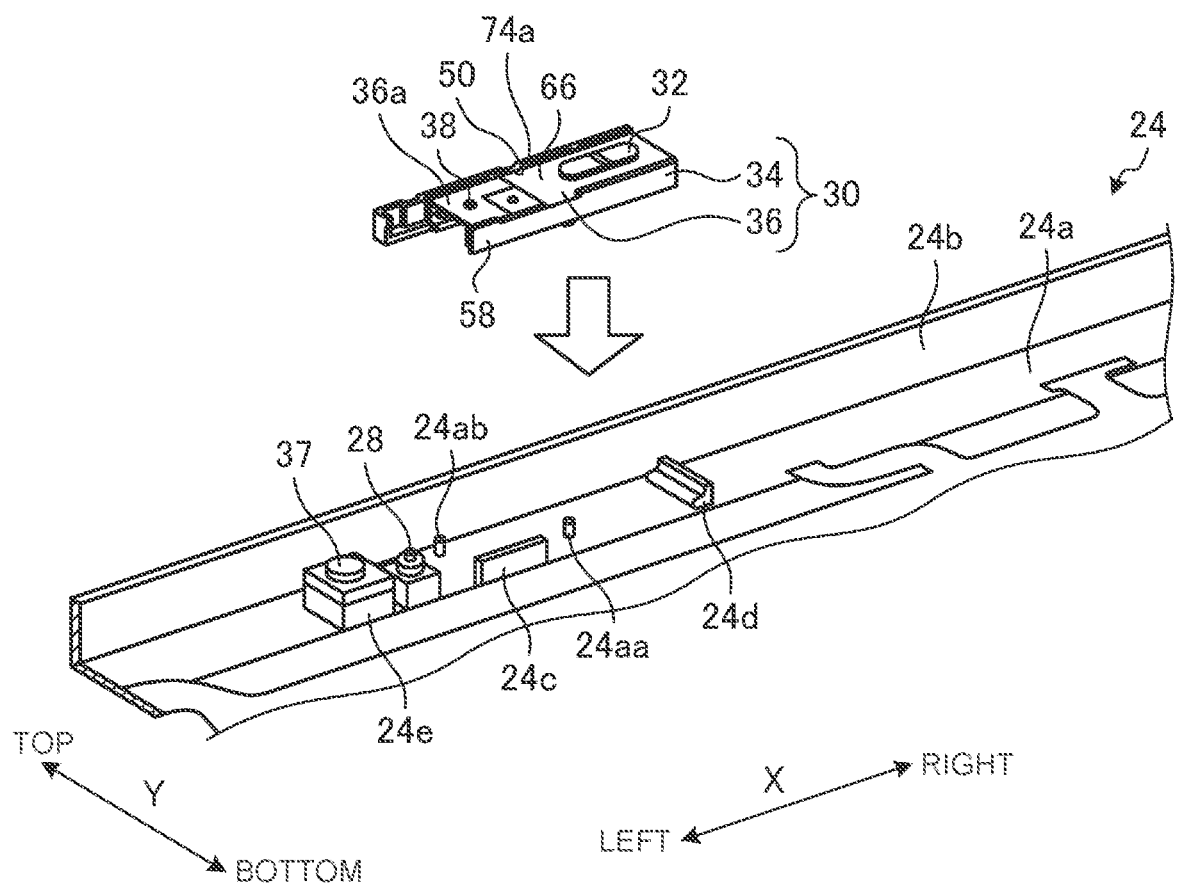
FIG. 8 is a perspective view illustrating a state of a process of mounting the assembled camera cover unit on the upper edge.

FIG. 6 is a flowchart illustrating a method of assembling the information device 10. FIG. 7 is a perspective view illustrating a state of the assembly process of the camera cover unit 30. FIG. 8 is a perspective view illustrating a state of the process of mounting the assembled camera cover unit 30 on the upper edge 24a.

Step S1 in FIG. 6 is the assembly process of the camera cover unit 30. In step S1, as illustrated in FIG. 7, the arm 58 of the cover case 34 is temporarily elastically deformed to the side opposite to the side where the cover body 36 is housed (i.e., outwardly from the cover body 36), so that the cover body 36 is housed in the cover case 34. In this process, both the cover case 34 and the cover body 36 can be assembled in a space with sufficient margin, not in a narrow space like the upper edge 24a, and the degree of freedom of work is high. Therefore, it is easy to place the small leaf spring 74 in a predetermined place such as the depression 52, and there is little concern about deformation. This prevents a poor action of the cover body 36 due to a deformation of the leaf spring 74 and the poor operability of the knob 32 due to a decrease in the elastic force of the leaf spring 74.

Particularly, in this process, the arm 58 can be temporarily elastically deformed to widen the area where the cover body 36 is inserted, thereby making it easy to house the cover body 36 in the cover case 34. Therefore, the camera cover unit 30 is easy to assemble, and the worker does not need any special training.

After housing the cover body 36 in the cover case 34, the arm 58, which has been temporarily elastically deformed, releases the biasing force and returns to the original state. This causes the guide protrusion 60b of the arm 58 to fit into the guide hole 72b. The guide protrusion 60a fits into the guide hole 72a in the process of housing the cover body 36 in the cover case 34.

Step S2 is a process of mounting the assembled camera cover unit 30 on the upper edge 24a. In step S2, as illustrated in FIG. 8, the assembled camera cover unit 30 is fixed to the upper edge 24a so that the arm 58 of the cover case 34 abuts on the in-frame support wall 24c. This fixing is performed, for example, by fixing the facing surfaces of the cover case 34 and the upper edge 24a with adhesive tape.

As described above, the camera cover unit 30 is positioned by inserting the positioning protrusions 24aa and 24ab into the positioning holes 40aa and 40ba, respectively. Furthermore, regarding the camera cover unit 30, the outer part of the frame is supported by the perimeter wall 24b, the right side is supported by the lateral support wall 24d, and the left side is supported by the support base 24e.

In addition, the in-frame support wall 24c supports the arm 58 from the side opposite to the side where the cover body 36 is housed. Although the arm 58 is elastic and is able to be displaced inward and outward of the frame, the arm 58 is supported and kept in place by the in-frame support wall 24c. Furthermore, the arm 58 is temporarily deformed in step S1, but even if it is slightly plastically deformed at that time, it is corrected by the in-frame support wall 24c in step S2. This ensures that the guide protrusion 60b fits into the guide hole 72b.

The present invention is not limited to the above-described embodiment, and naturally the present invention can be freely modified without departing from the gist of the present invention.

The invention claimed is:

1. An information device comprising:
   a display device;
   a back cover that covers a rear surface, the rear surface being on a non-display surface side of the display device;
   a camera that is fixed to an edge portion of the back cover and is able to shoot ahead; and
   a camera cover unit fixed to the edge portion,
   wherein:
   the camera cover unit includes:
      a cover case fixed to the edge portion; and
      a cover body that is housed in the cover case whereby a U-shaped recess of the cover case faces toward and receives a U-shaped channel of the cover body, and the cover body is slidable between a first position and a second position,
   the cover body includes:
      a camera cover that is moveable to the first position to cover a front of the camera and moveable to the second position to uncover the front of the camera; and
      an elastic body that is elastically deformable inward and outward of a frame of the edge portion;
   the cover case includes a protrusion that protrudes in a direction opposite to an acting part of the elastic body and, upon the cover body sliding between the first position and the second position, the protrusion presses and elastically displaces the acting part, so that thereafter the acting part goes over the protrusion;
   the cover case includes a cantilever arm that extends in a sliding direction of the cover body to support a side surface of the cover body and is elastically deformable outwardly from the cover body;
   the back cover includes a support wall that supports the arm from a side opposite a side where the cover body is housed;
   the cover body includes a guide hole that extends in the sliding direction on a surface facing the arm; and
   the arm includes a guide protrusion that is inserted in the guide hole.

2. The information device according to claim 1, wherein the elastic body is a cantilever leaf spring that extends in a sliding direction of the cover body.

3. The information device according to claim 1, wherein the protrusion is made of polyacetal.

4. An information device comprising:

a display device;

a back cover that covers a rear surface, the rear surface being on a non-display surface side of the display device;

a camera that is fixed to an edge portion of the back cover and is able to shoot ahead; and a camera cover unit fixed to the edge portion, wherein:

the camera cover unit includes:

a cover case fixed to the edge portion; and a cover body that is housed in the cover case whereby a U-shaped recess of the cover case faces toward and receives a U-shaped channel of the cover body, and the cover body is slidable between a first position and a second position, the cover body includes:

a camera cover that is moveable to the first position to cover a front of the camera and moveable to the second position to uncover the front of the camera; and an elastic body that is elastically deformable inward and outward of a frame of the edge portion;

the cover case includes a protrusion that protrudes in a direction opposite to an acting part of the elastic body and, upon the cover body sliding between the first position and the second position, the protrusion presses and elastically displaces the acting part, so that thereafter the acting part goes over the protrusion, wherein:

the back cover includes a perimeter wall that protrudes forward;

the outer wall of the frame of the cover case abuts the perimeter wall; and the protrusion is on the outer wall of the frame and protrudes in an inward direction of the frame.

\* \* \* \* \*